US007597153B2

(12) United States Patent
Thompson

(10) Patent No.: US 7,597,153 B2
(45) Date of Patent: Oct. 6, 2009

(54) AUTOMOTIVE ONBOARD FIRE SUPPRESSION SYSTEM RESERVOIR HAVING MULTIFUNCTION CONTROL VALVE

(75) Inventor: Robert H. Thompson, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/251,553

(22) Filed: Oct. 15, 2008

(65) Prior Publication Data

US 2009/0038813 A1 Feb. 12, 2009

Related U.S. Application Data

(63) Continuation of application No. 11/609,023, filed on Dec. 11, 2006, now abandoned, which is a continuation-in-part of application No. 10/907,134, filed on Mar. 22, 2005, now Pat. No. 7,198,111.

(51) Int. Cl.

| | |
|---|---|
| ***A62C 3/07*** | (2006.01) |
| ***A62C 35/00*** | (2006.01) |
| ***A62C 35/68*** | (2006.01) |
| ***A62C 35/13*** | (2006.01) |
| ***B05B 9/04*** | (2006.01) |
| ***F16K 17/26*** | (2006.01) |
| ***F16K 24/00*** | (2006.01) |

(52) U.S. Cl. ............................ 169/9; 169/62; 239/373; 137/493.6

(58) Field of Classification Search ..................... 169/5, 169/9, 54, 61, 62, 71, 84, 85; 239/172, 302, 239/337, 373, 407, 569, 570, 572, 583; 137/493.1, 137/493.6, 493.9

See application file for complete search history.

(56) References Cited

U.S. PATENT DOCUMENTS

| | | | |
|---|---|---|---|
| 4,132,271 | A | 1/1979 | Mikaila |
| 4,505,336 | A | 3/1985 | Thevis et al. |
| 5,129,386 | A | 7/1992 | Meister |
| 5,590,718 | A | 1/1997 | Bertossi |
| 5,613,564 | A | 3/1997 | Rhines |
| 5,762,145 | A | 6/1998 | Bennett |
| 5,808,541 | A | 9/1998 | Golden |
| 5,918,681 | A | 7/1999 | Thomas |
| 5,934,379 | A | 8/1999 | Ostlyngen et al. |
| 5,960,888 | A | 10/1999 | Moore, Sr. |
| 5,992,528 | A | 11/1999 | Parkinson et al. |
| 6,164,383 | A | 12/2000 | Thomas |
| 6,352,121 | B1 | 3/2002 | Pitell et al. |
| 6,981,555 | B2 | 8/2003 | Smith et al. |
| 6,702,033 | B1 | 3/2004 | Mitchell et al. |
| 2004/0084193 | A1 | 5/2004 | Tseng |
| 2004/0226726 | A1 | 11/2004 | Holland et al. |

*Primary Examiner*—Darren W Gorman
(74) *Attorney, Agent, or Firm*—Dickinson Wright PLLC; Frank MacKenzie

(57) ABSTRACT

An automotive vehicle includes a vehicle body and at least one reservoir containing a fire suppressant agent. A distribution system receives the fire suppression agent from the reservoir and conducts the agent to at least one location about the vehicle's body in response to the determination by a sensor system and controller that the vehicle has been subjected to a significant impact. The reservoir includes a multifunction valve element which controls pressure and vacuum within the reservoir during standby operation, while causing the fire suppressant agent to be directed through the distribution system if the propellant activates.

13 Claims, 10 Drawing Sheets

AUTOMOTIVE ONBOARD FIRE SUPPRESSION SYSTEM RESERVOIR HAVING MULTIFUNCTION CONTROL VALVE

CROSS-REFERENCE TO RELATED APPLICATIONS

This application is a continuation of U.S. patent application Ser. No. 11/609,023, filed Dec. 11, 2006, which is a continuation-in-part of U.S. Pat. No. 7,198,111, issued Apr. 3, 2007.

BACKGROUND OF THE INVENTION

1. Field of the Invention

The present invention relates to an automotive vehicle having an onboard apparatus for suppressing a vehicle fire.

2. Disclosure Information

Police vehicles are subject to increased exposure to collisions, particularly high speed rear-end collisions, arising from the need for police officers to stop on the shoulders, or even in the traffic lanes, of busy highways. Unfortunately, other motorists are known to collide with police vehicles employed in this manner. These accidents can compromise the fuel system on any vehicle and may cause fires. The present system is designed to suppress the spread of, or potentially, to extinguish such a fire. U.S. Pat. No. 5,590,718 discloses an anti-fire system for vehicles in which a number of fixed nozzles are furnished with a fire extinguishing agent in response to an impact sensor. The system of the ’718 patent suffers from a problem in that the fixed nozzles are not suited to the delivery of the extinguishing agent at ground level. Also, the ’718 patent uses a valving system which could become clogged and therefore inoperable. U.S. Pat. No. 5,762,145 discloses a fuel tank fire protection device including a powdered extinguishing agent panel attached to the fuel tank. In general, powder delivery systems are designed to prevent ignition of fires and are deployed upon impact. As a result, the powder may not be able to follow the post-impact movement of the struck vehicle and may not be able to prevent the delayed ignition or re-ignition of a fire.

The present fire suppression system provides significant advantages, as compared with prior art vehicular fire suppression systems.

SUMMARY OF THE INVENTION

According to an aspect of the present invention, an onboard fire suppression system includes at least one reservoir containing a fire suppressant agent, and a propellant, operatively associated with the reservoir, for expelling the fire suppressant agent from the reservoir under pressure. A distribution system receives fire suppression agent expelled from the reservoir and distributes it to at least one location. A multifunction control valve, operatively connected with the reservoir, maintains pressure within the reservoir within a predetermined range during standby operation, with the control valve closing in the event that the propellant is activated. The multi-function control valve includes a vacuum responsive element, a standby pressure relief element, and a high flow closure element. This control valve extends through a wall of the reservoir.

The valving functions of a multifunction control valve according to an aspect of the present invention are performed by a vacuum responsive element having an inward-opening poppet, by a standby pressure relief element having an outward-opening poppet, and by an outward-closing poppet which is responsive to high rate flow of the suppressant agent. The outward closing poppet closes in response to elevated suppressant flow rate and elevated suppressant pressure which normally accompanies discharge of the suppressant from the reservoir. The inward-opening poppet opens in the event that the pressure within the reservoir falls below a predetermined minimum pressure. The outward-opening poppet moves to an open position in the event that pressure within the reservoir exceeds a predetermined maximum static pressure, with the high flow-responsive poppet closing in the event that the pressure produced by the propellant exceeds a predetermined maximum dynamic pressure produced by an activated propellant.

According to another aspect of the present invention, the inward-opening poppet and the outward-opening poppet are resiliently biased into normally-closed positions, with the outward-closing poppet being resiliently biased into a normally-open position.

According to another aspect of the present invention, a propellant may either be housed within the reservoir or external to the reservoir.

According to another aspect of the present invention, the multi-function control valve may be contained within a filler port plug for the reservoir.

It is an advantage of a onboard fire suppression system according to the present invention that pressure changes due to environmental conditions such as changes in altitude and changes in ambient temperature may be accommodated by a fire suppression system reservoir without concomitant material fatigue due to flexing which could otherwise be caused by such changes in pressure.

Other advantages, as well as features of the present invention will become apparent to the reader of this specification.

DETAILED DESCRIPTION OF THE PREFERRED EMBODIMENTS

Figure 1:
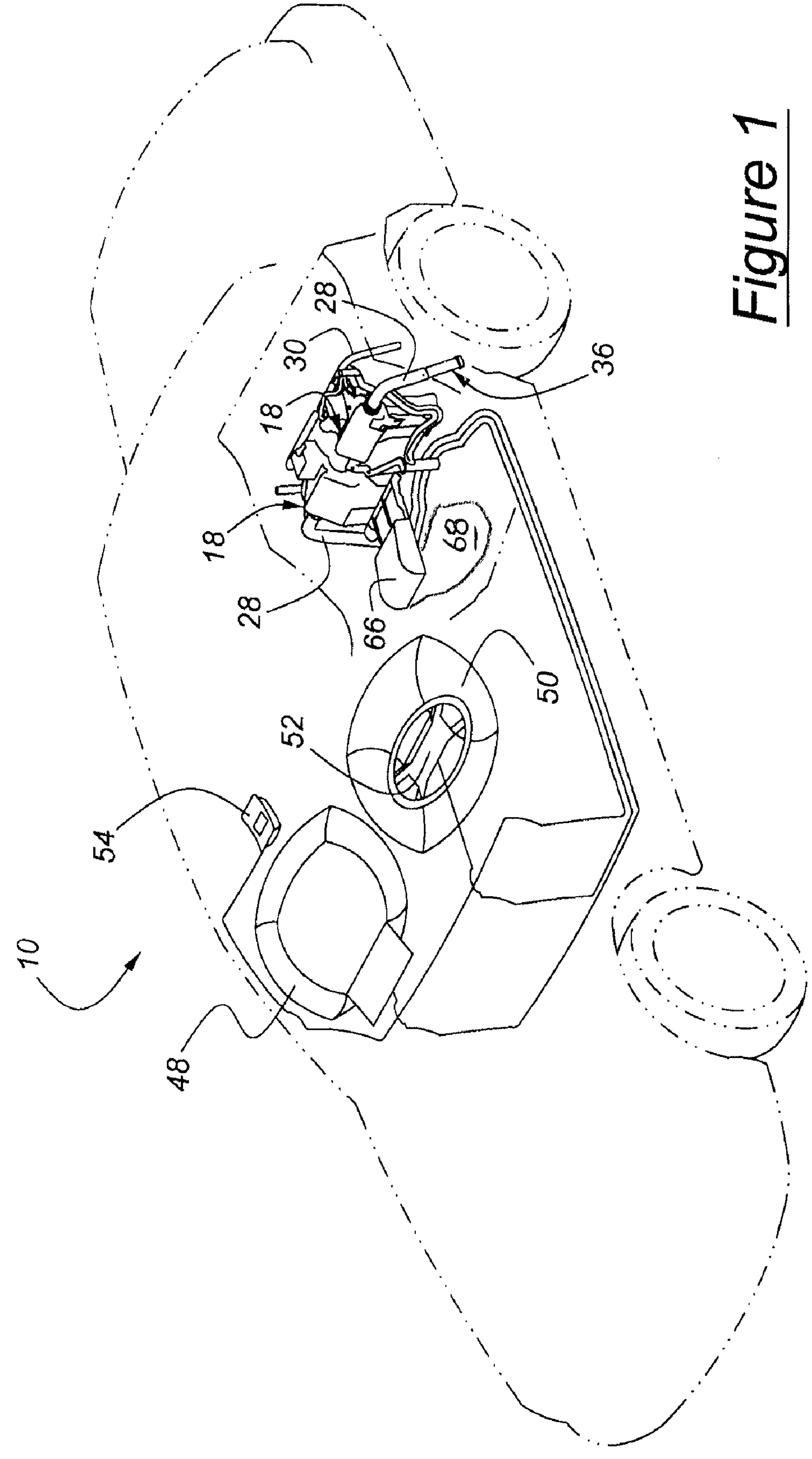
FIG. 1 is a ghost perspective view of an automotive vehicle having a fire suppression system according to the present invention.

As shown in FIG. 1, vehicle 10 has a passenger airbag restraint 48 and a driver's airbag restraint 50 mounted adjacent steering wheel 52. A fire suppression system includes controller 66 which is mounted upon floor pan 68 of vehicle 10, and reservoirs 18 which are mounted under floor pan 68 in the so-called kick-up area adjoining the rear axle of vehicle 10. Those skilled in the art will appreciate in view of this disclosure that additional passenger restraint devices, such as seat belt pretensioners and side airbags, may be installed in a vehicle and controlled at least in part by, or in conjunction with, controller 66.

Figure 2:
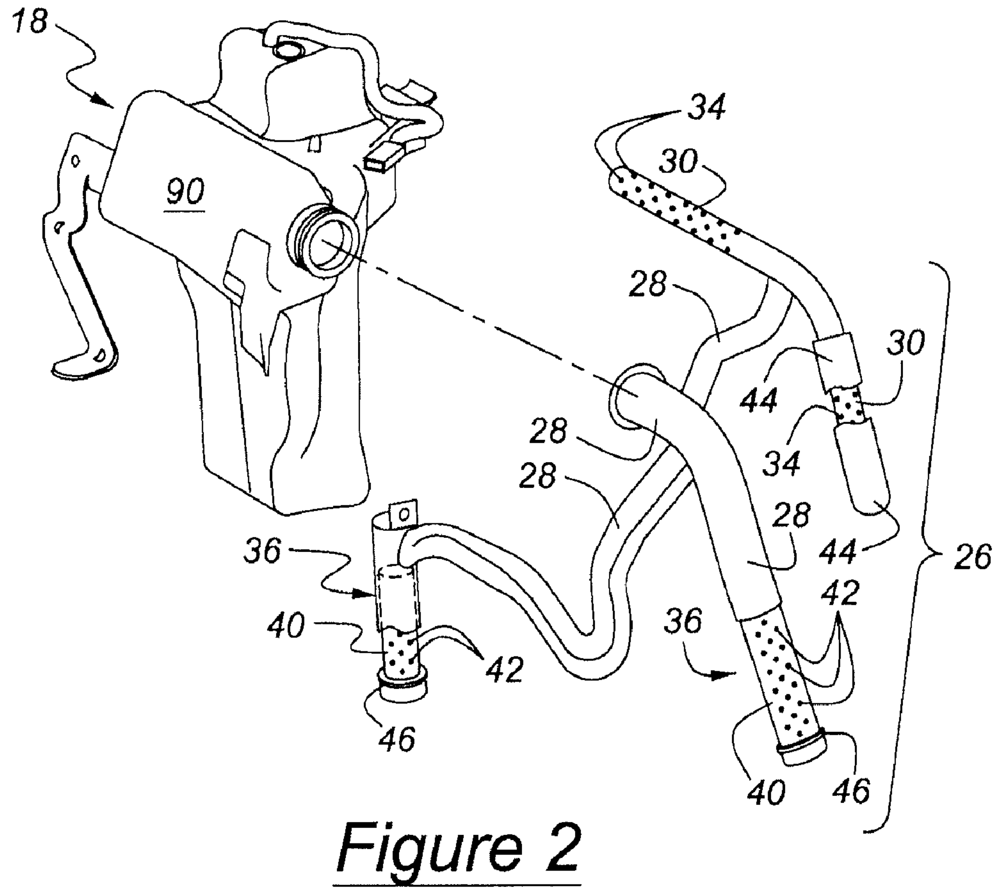
FIG. 2 is an exploded perspective view of a portion of a fire suppression system according to the present invention.
Figure 8:
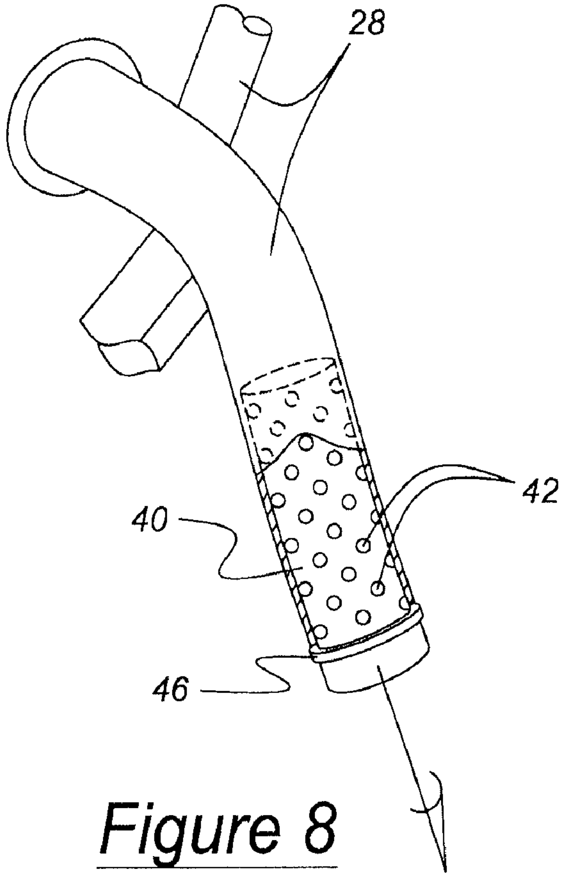
FIG. 8 is a perspective view of a variable geometry fire suppression agent nozzle according to one aspect of the present invention.

FIG. 1 shows not only reservoirs 18 but also a portion of right and left side fire suppression conduits 28, as well as fixed geometry nozzles 30 and variable geometry nozzles 36. As seen in FIG. 1, variable geometry nozzles 36 project downwardly to allow fire suppression agent to be expelled from reservoirs 18 and placed at a low angle to the ground surface the vehicle is operating upon. This mode of operation is possible because variable geometry nozzles 36 are, as shown in FIG. 2, telescopingly extensible. This telescoping feature, which is shown in greater detail in FIG. 8, is produced by a sliding spray head, 40, which is slidingly engaged with conduit 28 such that gas pressure within conduit 28 forces spray head 40 downwardly into its extended position, causing fire suppression agent 22 to be discharged through a number of holes 42 formed in spray head 40. As shown in FIG. 2, at least two variable geometry nozzles 36 may be employed with single reservoir 18, along with at least two fixed nozzles 30 which are spray bars each having a number of orifices 34. While in their normally closed state, variable geometry nozzles 36 are liquid-tight by virtue of seals 46, which are interposed between an end of each of spray heads 40 and the corresponding ends of conduits 28. In a preferred embodiment, seals 46 comprise elastomeric boots attached to an outer surface of conduit 28. Seals 46 are simply sheared by the deploying spray head 40 when the present system is discharged. Fixed nozzles 30 are also rendered liquid-tight by covers 44, which are simply blown off when the present system is discharged. The sealing of nozzles 30 and 36 is important, because this prevents the ingress of road splash, which could block the system in sub-freezing weather or cause corrosion or blockage due to mud or other foreign matter.

Figure 7:
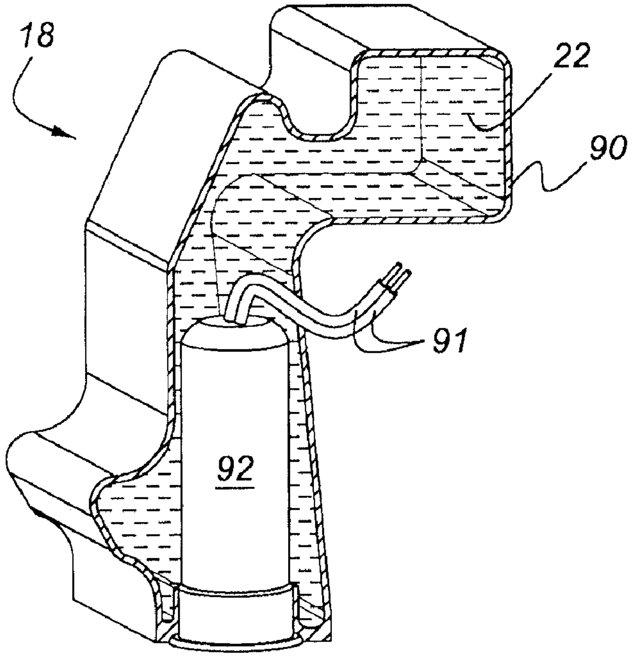
FIG. 7 is a cutaway perspective view of a fire suppression agent reservoir according to one aspect of the present invention.

Additional details of reservoir 18 are shown in FIG. 7. Tank 90 contains approximately 1.5 L of fire suppression agent 22, and a propellant 92. Propellant 92 includes two squibs (not shown) which are activated simultaneously by controller 66 via lines 91 so as to release a large amount of gas, forcing fire suppressant agent 22 from tank 90 and into distribution system 26, including conduit 28 and the various fixed and variable geometry nozzles. A preferred propellant, marketed by Primex Aerospace Company as model FS01-40, is a mixture including aminotetrazole, strontium nitrate, and magnesium carbonate. This is described in U.S. Pat. No. 6,702,033, which is hereby incorporated by reference into this specification.

Those skilled in the art will appreciate in view of this disclosure that other types of propellants could be used in the present system, such as compressed gas canisters and other types of pyrotechnic and chemical devices capable of creating a gas pressure force in a vanishingly small amount of time.

Moreover, fire suppressant agent 22, which preferably includes a water-based solution with hydrocarbon surfactants, fluorosurfactants, and organic and inorganic salts sold under the trade name LVS Wet Chemical Agent® by Ansul Incorporated could comprise other types of agents such as powders or other liquids, or yet other agents known to those skilled in the art and suggested by this disclosure. If two reservoirs 18 are employed with a vehicle, as is shown in FIG. 1, all four squibs will be deployed simultaneously.

Figure 4:
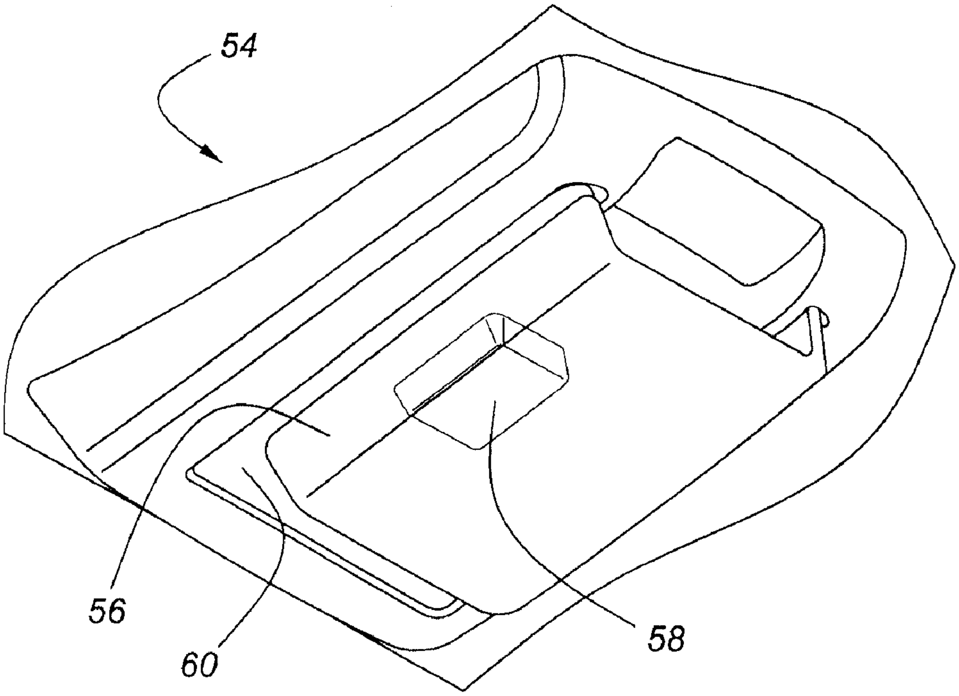
FIG. 4 is a perspective view of a manually activatable switch used with a fire suppression system according to the present invention.

FIG. 4 shows manually activatable switch 54 for use with the present system. As shown in FIG. 1, switch 54 may be advantageously located on the headliner of vehicle 10 between the sun visors, or at any other convenient position. To use this switch 54, hinged clear cover 56 is first opened by pressing on cover 56. Thereafter, the fire suppression system may be triggered by manually pressing pushbutton 58. If the vehicle occupants are not disposed to release cover 56, the system may be triggered by merely sharply depressing cover 56, thereby closing contacts (not shown) contained within platform 60.

Figure 3:
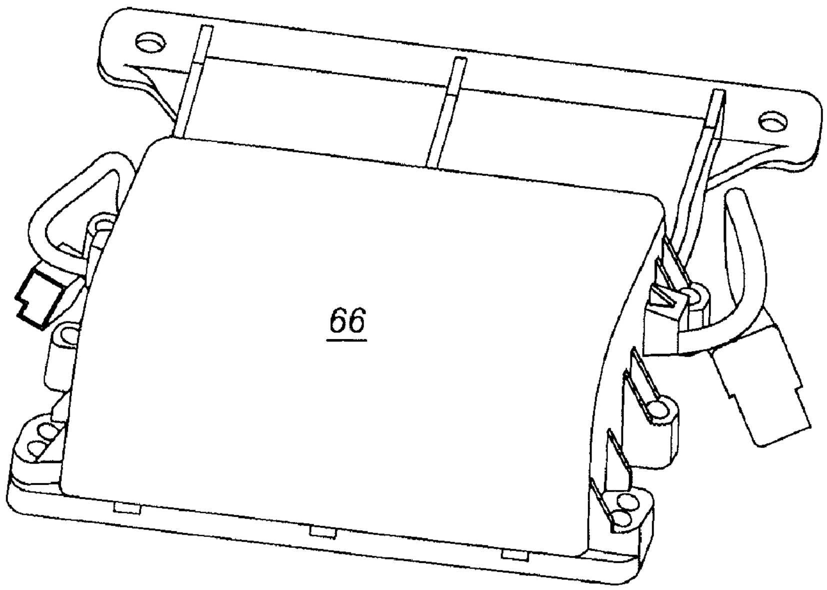
FIG. 3 is a perspective view of a control module used with a system according to the present invention.
Figure 5:
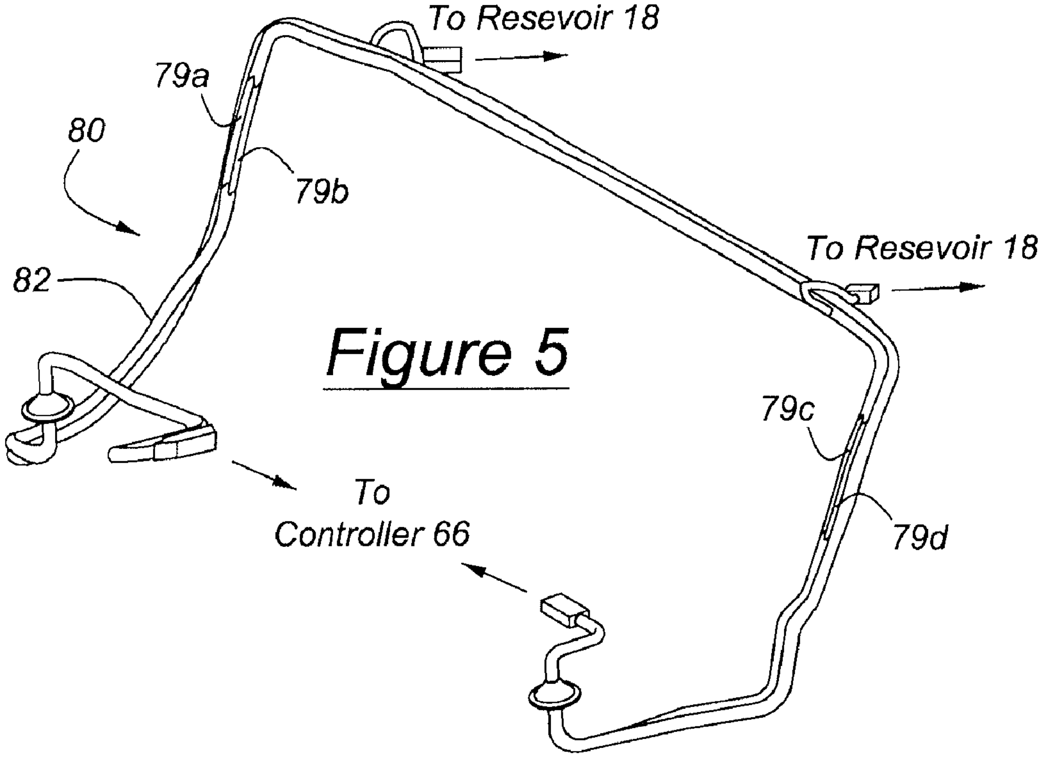
FIG. 5 illustrates a portion of a wiring harness used with the present system.

Because the present system is intended for use when the vehicle has received a severe impact, controller 66, which is shown in FIG. 3, contains a redundant power reserve or supply, which allows operation of the fire suppression system for about nine seconds, even if controller 66 becomes isolated from the vehicle's electrical power supply. Wiring harness 80, as shown in FIG. 5, is armored, and has a para-aramid fiber inner sheath, 82, of about 2 mm in thickness, which helps to shield the conductors within harness 80 from abrasion and cutting during a vehicle impact event. This para-aramid fiber is sold under the trade name KEVLAR® by the DuPont Company. This armoring helps to assure that communication between controller 66 and reservoirs 18 remains in effect during an impact event. Post-impact communications are further aided by redundancy in the control system. Specifically, four independent sets of primary conductors, 79*a-d*, extend from controller 66 to reservoirs 18 protected by sheath 82. Moreover, an H-conductor, shown at 81 in FIG. 5, extends between reservoirs 18. Thus, if one or both of the primary conductors 79*a-b*, or 79*c-d*, extending to one of reservoirs 18 should become severed, H-conductor 81 will be available to carry the initiation signal from the undamaged lines to both of reservoirs 18.

Figure 9:
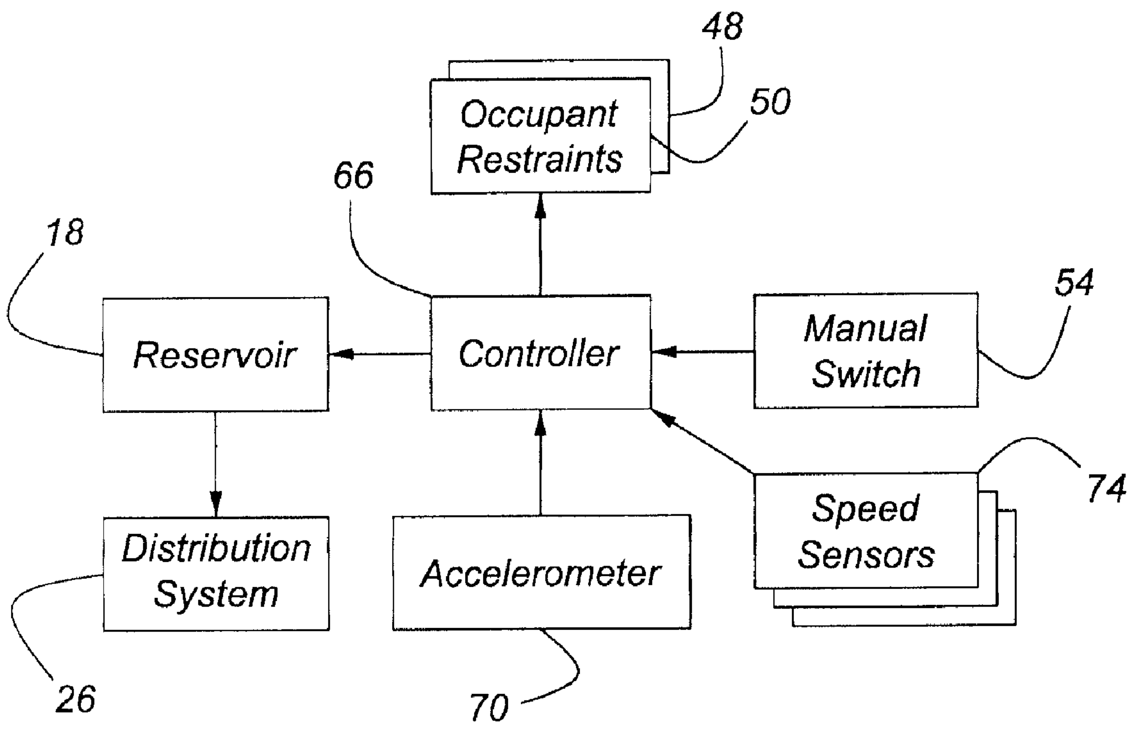
FIG. 9 is a block diagram of a fire suppression system and with additional components for occupant restraint according to one aspect of the present invention.

As noted above, an important feature of the present invention resides in the fact that the control parameters include not only vehicle impact, as measured by an accelerometer such as that shown at 70 in FIG. 9, but also vehicle speed, as measured by means of speed sensors 74, also shown in FIG. 9. Speed sensors 74 may advantageously be existing sensors used with an anti-lock braking system or vehicle stability system. Alternatively, speed sensors 74 could comprise a global positioning sensor or a radar or optically based ground-sensing system. Accelerometer 70, as noted above, could be used with a conventional occupant restraint airbag system, thereby maximizing use of existing systems within the vehicle. Advantageously, accelerometer 70 may be an amalgam of two or more accelerometers having differing sensing ranges. Such arrangements are known to those skilled in the art and suggested by this disclosure. At least a portion of the various sensors could either be integrated in controller 66 or distributed about vehicle 10.

Figure 6:
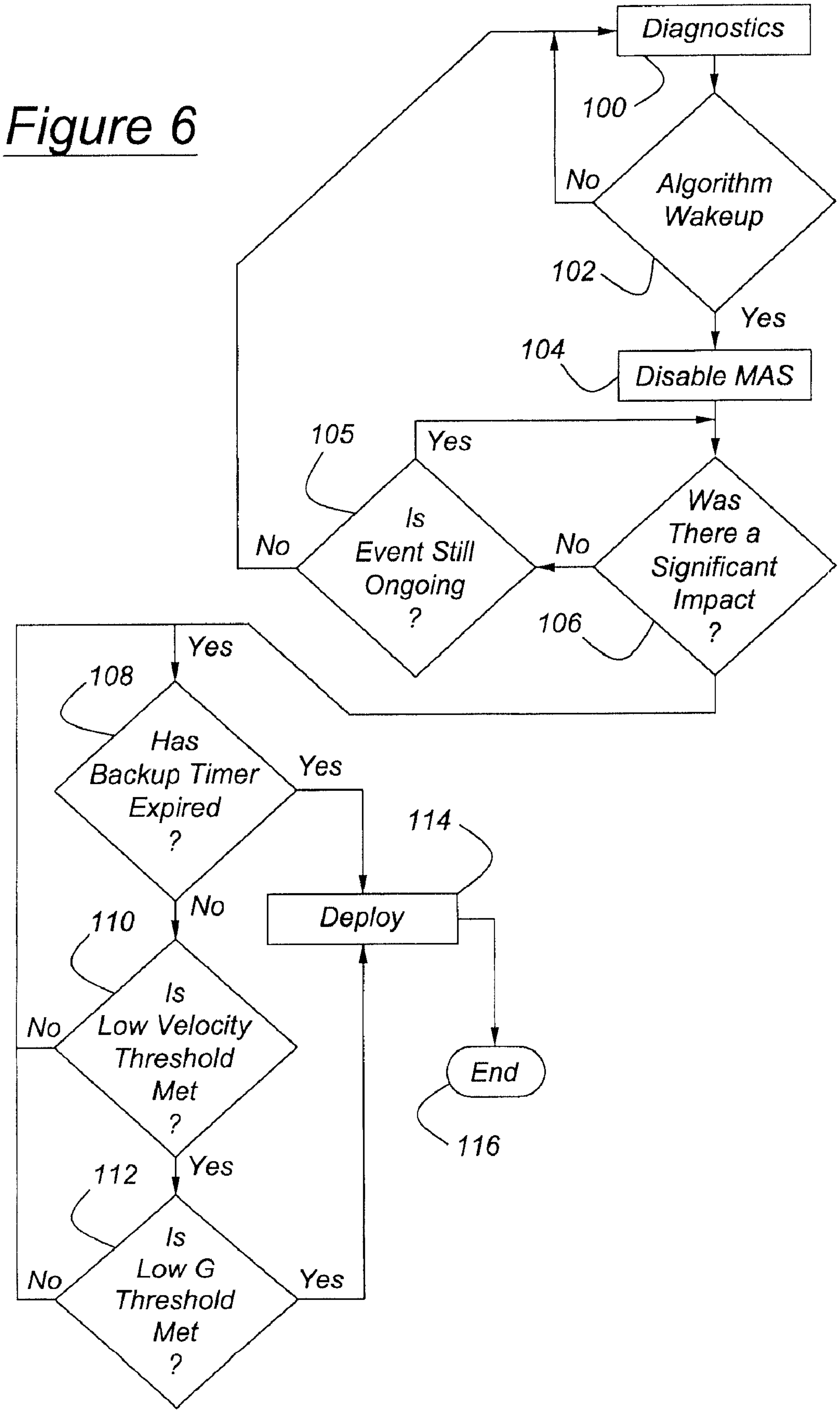
FIG. 6 is a flowchart showing a portion of the logic used to control a system according to the present invention.

FIG. 6 shows a sequence which is used according to one aspect of the present invention for activating a release of fire suppressant agent.

Beginning at block 100, controller 66 performs various diagnostics on the present system, which are similar to the diagnostics currently employed with supplemental restraint systems. For example, various sensor values and system resistances will be evaluated on a continuous basis. Controller 66 periodically moves to block 102, wherein the control algorithm will be shifted from a standby mode to an awake mode in the event that a vehicle acceleration, or, in other words, an impact, having a magnitude in excess of a relatively low threshold is sensed by accelerometer 70. Also, at block 102 a backup timer will be started. If the algorithm is awakened at block 102, controller 66 disables manually activatable switch 54 at block 104 for a predetermined amount of time, say 150 milliseconds. This serves to prevent switch 54 from inadvertently causing an out-of-sequence release of fire suppression agent. Note that at block 104, a decision has not yet been made to deploy fire suppression agent 22 as a result of a significant impact.

At block 106, controller 66 uses output from accelerometer 70 to determine whether there has been an impact upon vehicle 10 having a severity in excess of a predetermined threshold impact value. Such an impact may be termed a significant, or "trigger", impact. If an impact is less severe than a trigger impact, the answer at block 106 is "no", and controller 66 will move to block 105, wherein an inquiry is made regarding the continuing nature of the impact event. If the event has ended, the routine moves to block 100 and continues with the diagnostics. If the event is proceeding, the answer at block 105 is "yes", and the routine loops to block 106.

If a significant impact is sensed by the sensor system including accelerometer 70 and controller 66, the answer at block 106 will be "yes." If such is the case, controller 66 moves to block 108 wherein the status of a backup timer is checked. This timer was started at block 102.

Once the timer within controller 66 has counted up to a predetermined, calibratable time on the order of, for example, 5-6 seconds, controller 66 will cause propellant 92 to initiate delivery of fire suppressant agent 22, provided the agent was not released earlier. Propellant 92 is activated by firing an electrical squib so as to initiate combustion of a pyrotechnic charge. Alternatively, a squib may be used to pierce, or otherwise breach, a pressure vessel. Those skilled in the art will appreciate in view of this disclosure that several additional means are available for generating the gas required to expel fire suppressant agent 22 from tank 90. Such detail is beyond the scope of this invention. An important redundancy is supplied by having two squibs located within each of tanks 90. All four squibs are energized simultaneously.

The velocity of the vehicle 10 is measured at block 110 using speed sensors 74, and compared with a low velocity threshold. In essence, controller 66 processes the signals from the various wheel speed sensors 74 by entering the greatest absolute value of the several wheel speeds into a register. This register contains both a weighted count of the number of samples below a threshold and a count of the number of samples above the threshold. When the register value crosses a threshold value, the answer at block 110 becomes "yes." In general, the present inventors have determined that it is desirable to deploy fire suppression agent 22 prior to the vehicle coming to a stop. For example, fire suppression agent 22 could be dispersed when the vehicle slows below about 15 kph.

At block 112, controller 66 enters a measured vehicle acceleration value into a second register. Thereafter, once the acceleration register value decays below a predetermined low g threshold, the answer becomes "yes" at block 112, and the routine moves to block 114 and releases fire suppressant agent 22. In essence, a sensor fusion method combines all available sensor information to verify that the vehicle is approaching a halt. The routine ends at block 116. Because the present fire suppression system uses all of the available fire suppression agent 22 in a single deployment, the system cannot be redeployed without replacing at least reservoirs 18.

FIG. 6 does not include the activation of occupant restraints 48 and 50, it being understood that known control sequences, having much different timing constraints, may be employed for this purpose. In point of contrast, the low velocity threshold allows the present system to deliver the fire suppression agent while the vehicle is still moving, albeit at a very low velocity. This prevents the rear wheels of the vehicle from shadowing, or blocking dispersion of fire suppressant agent 22. Also, in many cases, a vehicular fire may not become well-established until the vehicle comes to a halt.

Figure 10:
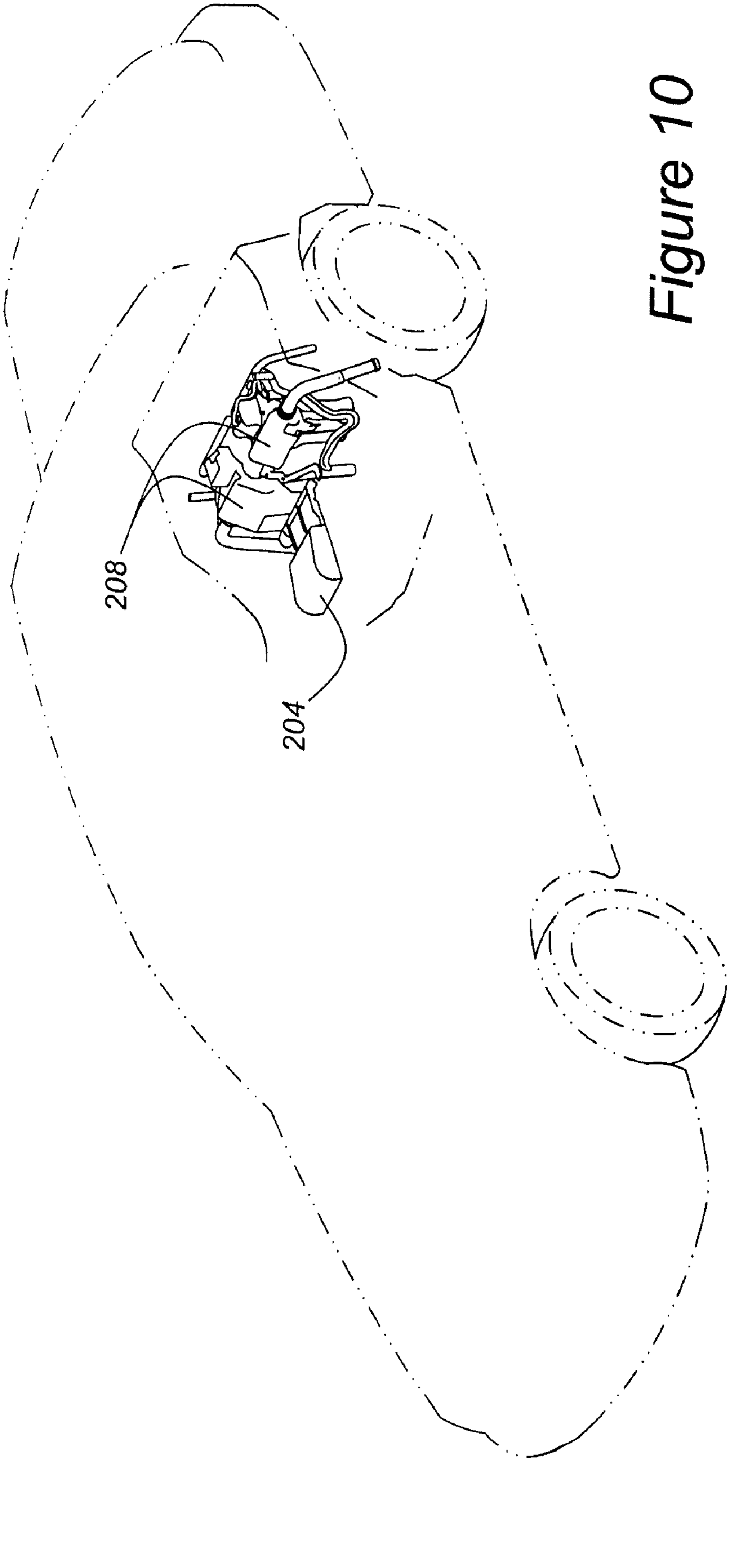
FIG. 10 is a perspective view of a vehicle having a fire suppression system with a reservoir having a multifunction control valve according to one aspect of the present invention.
Figure 11:
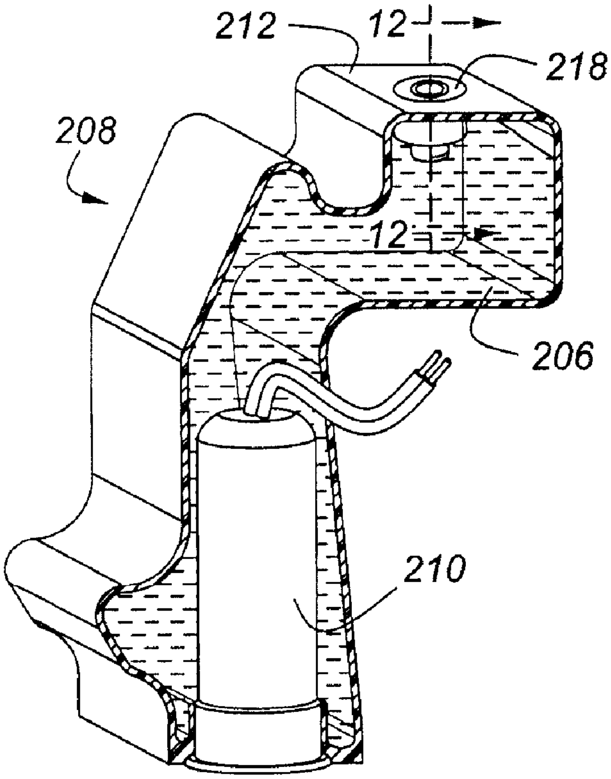
FIG. 11 is a perspective view of a suppression agent reservoir according to one aspect of the present invention.

As shown in FIG. 10, vehicle 200 has controller 204 for operating an onboard fire suppression system. As shown in FIG. 11, a supply of fire suppression agent 206 is contained within reservoirs 208, with only one reservoir 208 being shown. Propellant 210 provides energy for forcing agent 206 from reservoir 208 under pressure when so directed by controller 204.

Figure 12:
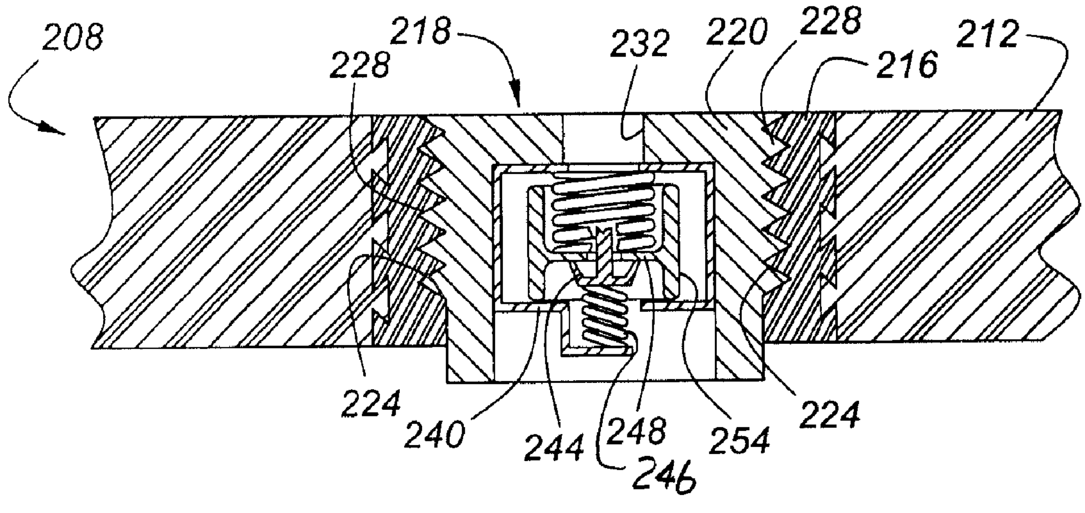
FIG. 12 is a sectional view of the reservoir of FIG. 11, taken along the line 12-12 of FIG. 11.

Reservoir 208 has a combination fill plug and control valve inserted in an upper wall, 212. As shown in FIG. 12, upper wall 212 has a threaded insert, 216, mounted therein. In a preferred embodiment, reservoir 208 is formed as fiber-reinforced resin composite, for the purpose of saving weight and avoiding corrosion in a difficult automotive environment.

Figure 13:
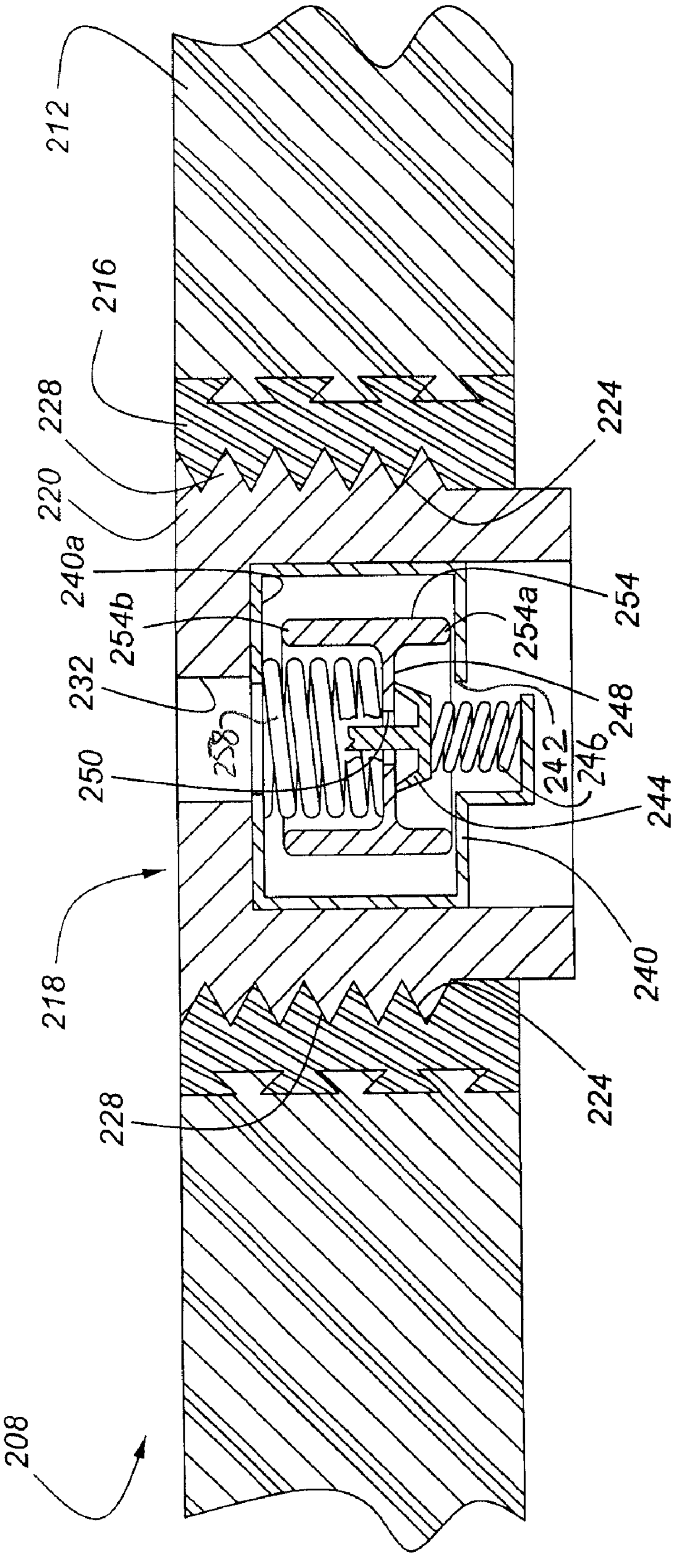
FIG. 13 is an enlarged view of the control valve shown in FIG. 12.

As shown in FIGS. 12 and 13, control valve 218 is mounted within a valve holder 220, which is itself threaded into threaded insert 216. Threads 228 and 224 are provided for this purpose. Valve holder 220 has a discharge port, 232, which allows gases to enter and leave reservoir 208 as described herein.

Control valve 218 includes three valve elements, with all three valve elements being mounted within valve body 240 which is mounted within valve holder 220. The first valve element is an inward-opening poppet, 244, which seats on median bulkhead 248 of outward-opening poppet 254. Inward-opening poppet 244 cooperates with vacuum orifice 250 (FIG. 13) formed in median bulkhead 248 of outward-opening poppet 254, to establish a minimum pressure value for the gas within reservoir 208. In aid of this objective, compression spring 246 urges inward-opening poppet 244 into contact with median bulkhead 248, so as to prevent gases from leaving reservoir 208. This is important when propellant 210 functions, because otherwise suppressant agent would be lost through control valve 218. In essence, inward-opening poppet 244 functions as a vacuum responsive element to maintain minimum pressure within reservoir 208 during standby operation of the present onboard fire suppression system. In so doing, inward-opening poppet 244 prevents undue working, or perhaps even work hardening, of reservoir 208 due as a result of flexure incurred at low pressure resulting from altitude or meteorological changes.

Outward-opening poppet 254 functions as both a standby pressure relief element having an outwardly-opening poppet, and an outward-closing poppet responsive to high rate flow of suppressant agent 206. Outward opening poppet 254 is positioned against valve body 240 at sealing surface 254*a*, by means of compression spring 258. When pressure within reservoir 208 rises at a slow rate during standby operation, spring 258 will be compressed and gas or other fluid will be allowed to flow through control passage 242, past sealing surface 254*a*, and then through discharge port 232. If, however, propellant 210 activates, the high flow of suppressant agent 206 leaving reservoir 208, which is accompanied by a high dynamic pressure, will cause poppet 254 to move upwardly so as to engage sealing surface 254*b* with upper surface 240*a* of valve body 240, thereby preventing an outflow of suppressant agent 206 through discharge port 232. Poppet 254 is thus seen to be a dual-mode poppet functioning as a type of spool valve.

Figure 14:
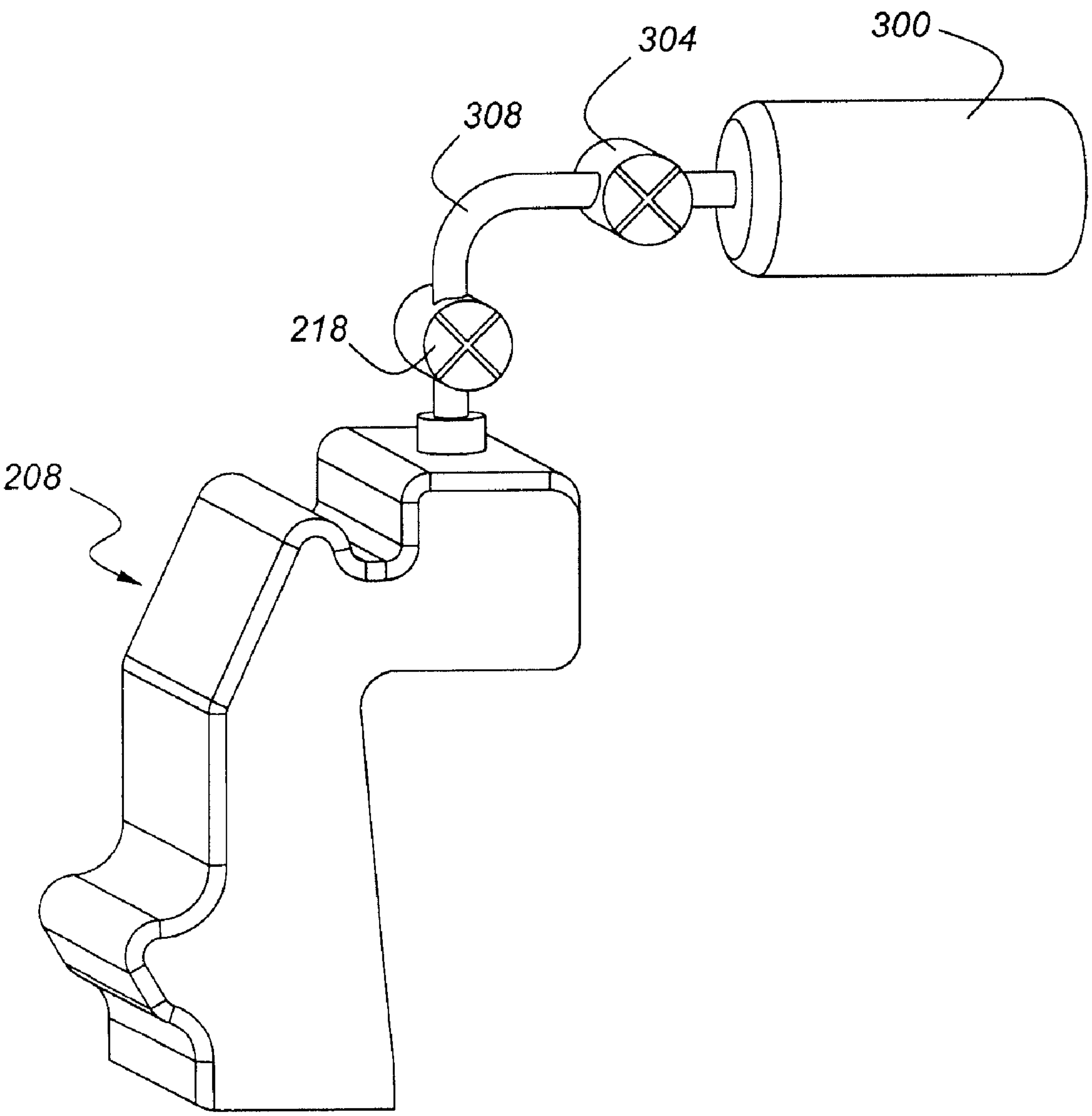
FIG. 14 is perspective view similar to FIG. 11, but illustrating a reservoir teamed with an external propellant.

FIG. 14 shows an externally located propellant, 300, which preferably comprises a cold gas inflator. Controller 204 operates valve 304 to allow compressed gas within propellant 300 to travel through conduit 308 into reservoir 208. In this embodiment, multifunction control valve 218 is mounted in a portion of conduit 308.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An onboard fire suppression system, comprising:

at least one reservoir containing a fire suppressant agent;

a propellant, operatively associated with said reservoir, for expelling the fire suppressant agent from the reservoir under pressure;

a distribution system for receiving fire suppressant agent expelled from said reservoir and for distributing the suppressant agent; and a multifunction control valve, operatively connected with said reservoir, for maintaining pressure within said reservoir within a predetermined range during standby operation, with said control valve closing in the event that said propellant is activated, wherein said multifunction control valve comprises a vacuum responsive element, a standby pressure relief element, and a high flow closure element.

2. An onboard fire suppression system according to claim 1, wherein said control valve extends through a wall of said reservoir, with said vacuum responsive element having an inward-opening poppet, and with said standby pressure relief element having an outward-opening poppet, and with said high flow closure element comprising an outward-closing poppet responsive to high rate flow of the suppressant agent.

3. An onboard fire suppression system according to claim 2, wherein said outward closing poppet closes in response to an elevated suppressant flow rate and elevated suppressant pressure accompanying discharge of said suppressant from said reservoir.

4. An onboard fire suppression system according to claim 2, wherein said inward-opening poppet opens in the event that pressure within said reservoir falls below a predetermined minimum pressure, with said outward-opening poppet moving to an open position in the event that pressure within the reservoir exceeds a predetermined maximum static pressure, and with said high flow-responsive poppet closing in the event that pressure produced by said propellant exceeds a predetermined maximum dynamic pressure.

5. An onboard fire suppression system according to claim 2, wherein said inward-opening poppet and said outward-opening poppet are resiliently biased into normally-closed positions, with said outward-closing poppet being resiliently biased into a normally-open position.

6. An onboard fire suppression system according to claim 1, wherein said propellant is housed within said reservoir.

7. An onboard fire suppression system according to claim 1, wherein said propellant is external to said reservoir, and said multi-function control valve is located within a conduit extending between said reservoir and said propellant.

8. An onboard fire suppression system according to claim 1, wherein said multifunction control valve is contained within a filler port plug for said reservoir.

9. An onboard fire suppression system according to claim 1, wherein said reservoir comprises a fiber-reinforced resin composite.

10. An onboard fire suppression system, comprising:

at least one reservoir containing a fire suppressant agent;

a propellant, operatively associated with said reservoir, for expelling the fire suppressant agent from the reservoir under pressure;

a distribution system for receiving fire suppressant agent expelled from said reservoir and for distributing the suppressant agent; and a multifunction control valve, operatively connected with said reservoir, for maintaining pressure within said reservoir within a predetermined range during standby operation of said fire suppression system, with said control valve comprising: a vacuum responsive element having an inward-opening poppet; and a dual-mode poppet having an outward-opening valve element for standby pressure relief, and an outward-closing valve element for shutting off flow through the multifunction control valve if the propellant is activated.

11. An onboard fire suppression system according to claim 10, wherein said outward-opening valve element and said outward-closing valve element comprise opposite ends of a unitary valve spool.

12. An onboard fire suppression system according to claim 11, wherein said inward-opening poppet cooperates with a vacuum orifice formed in said valve spool to establish a minimum pressure value for said reservoir.

13. An onboard fire suppression system according to claim 10, wherein said reservoir comprises a fiber-reinforced resin composite.

* * * * *